3 Sheets--Sheet 1.

J. MYERS.
Steering Apparatus.

No. 141,660. Patented August 12, 1873.

Witnesses.
D. W. Haynes
Wm. Grogan

Inventor.
John Myers

3 Sheets--Sheet 2.
J. MYERS.
Steering Apparatus.
No. 141,660. Patented August 12, 1873.
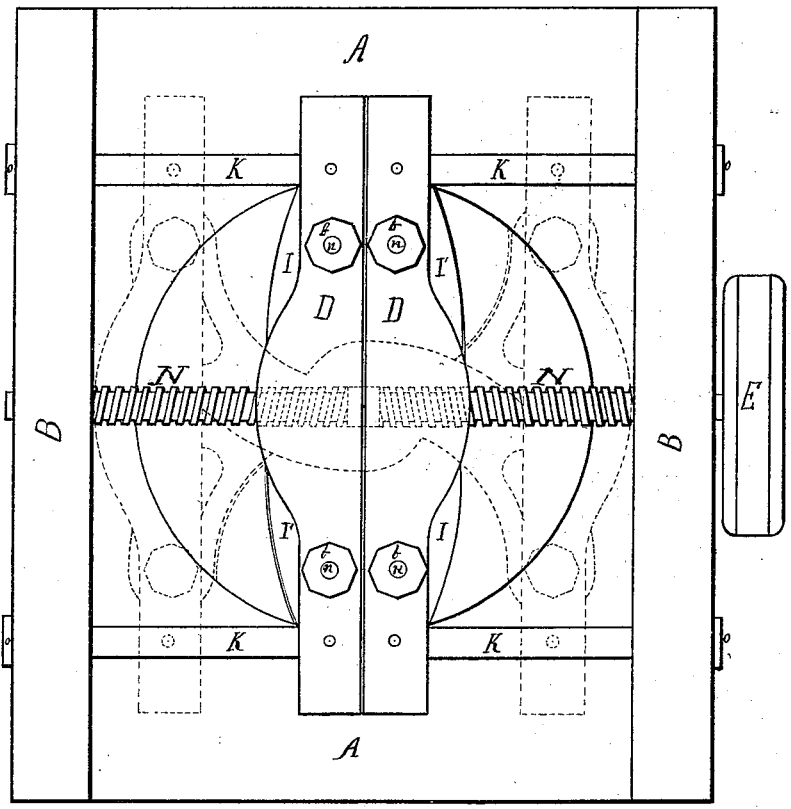
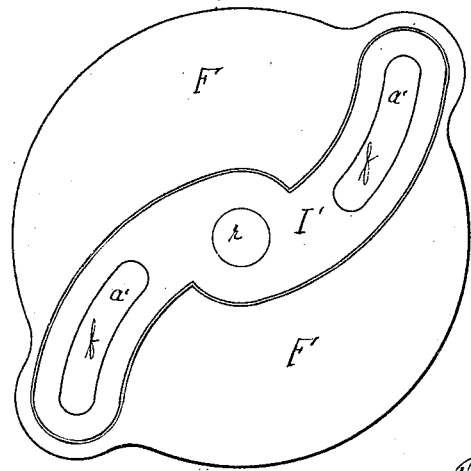
Witnesses.
D. W. Haynes
Wm. Grogan
Inventor.
John Myers

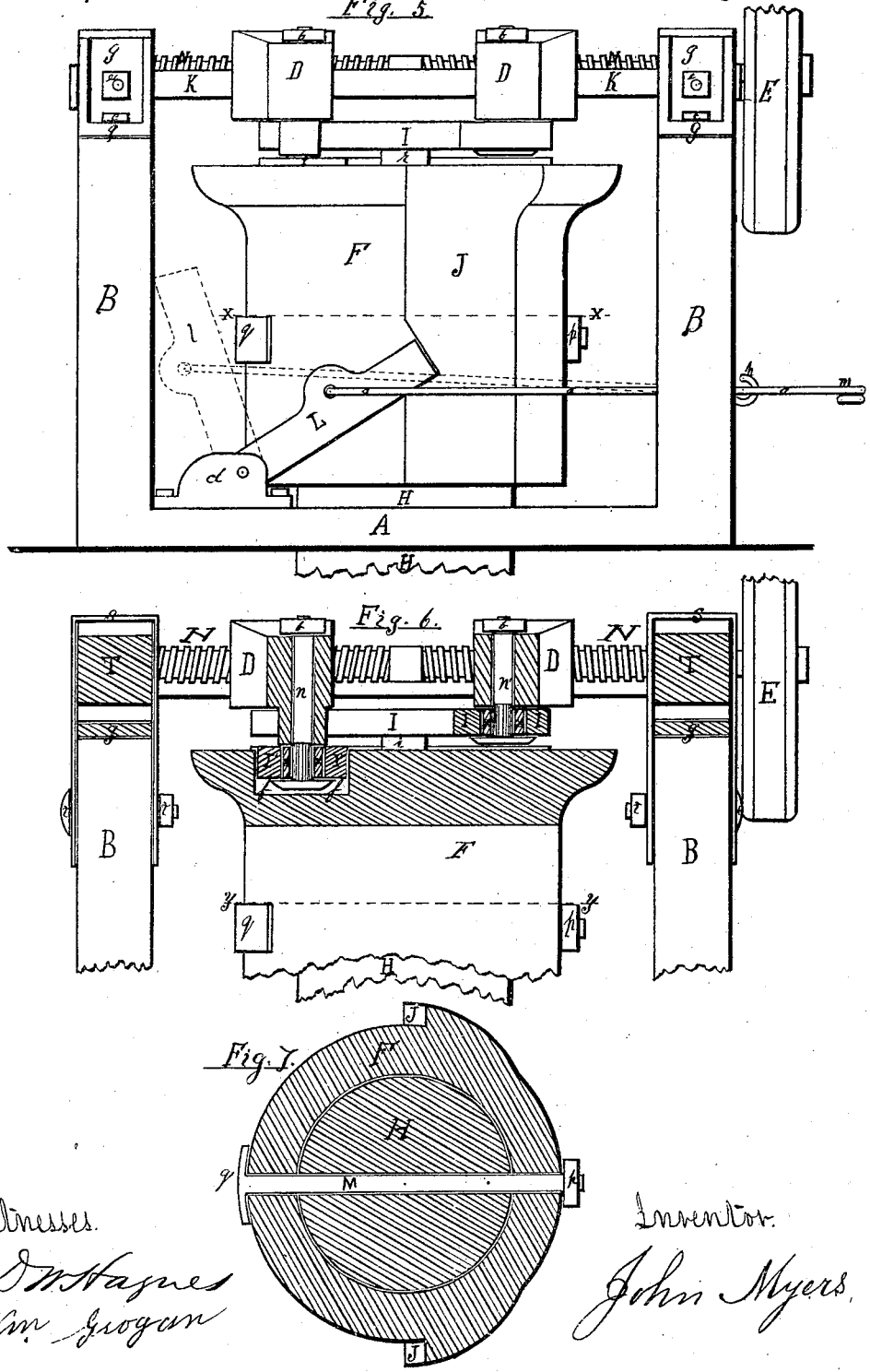

UNITED STATES PATENT OFFICE.

JOHN MYERS, OF JERSEY CITY, NEW JERSEY.

IMPROVEMENT IN STEERING APPARATUS.

Specification forming part of Letters Patent No. 141,660, dated August 12, 1873; application filed April 23, 1873.

*To all whom it may concern:*

Be it known that I, JOHN MYERS, of Jersey City, Hudson county, State of New Jersey, have invented an Improved Device for Steering Ships; and I do hereby declare that the following is a full and exact description thereof, reference being had to the accompanying drawings making a part of this specification.

Figure 1:
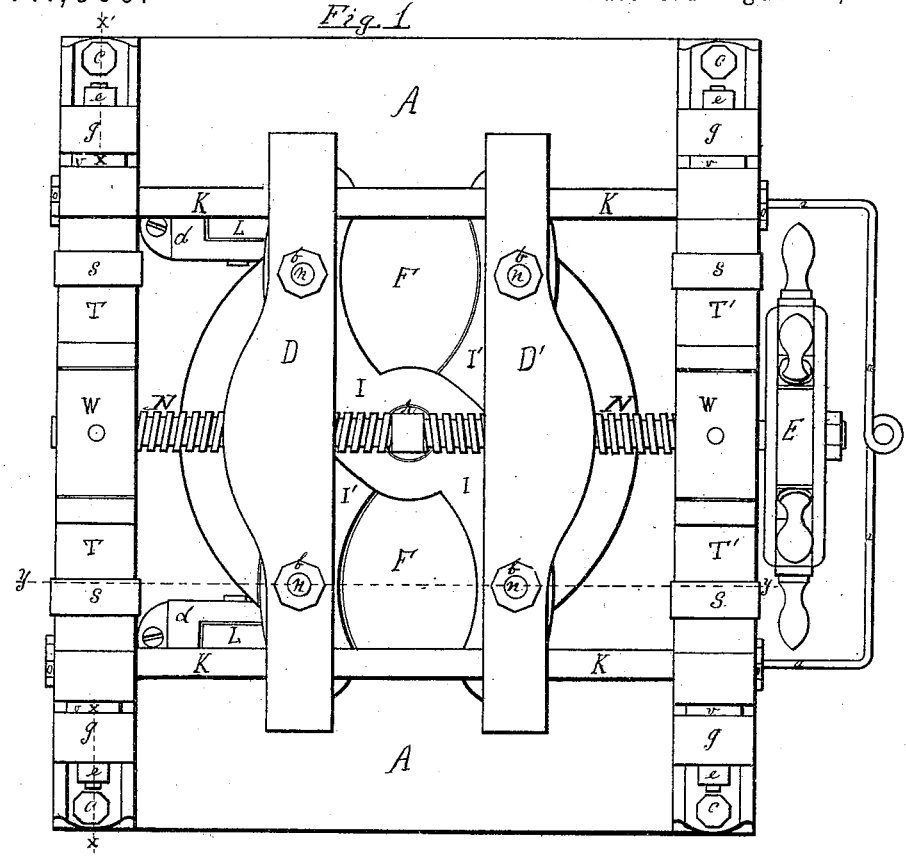
Figure 2:
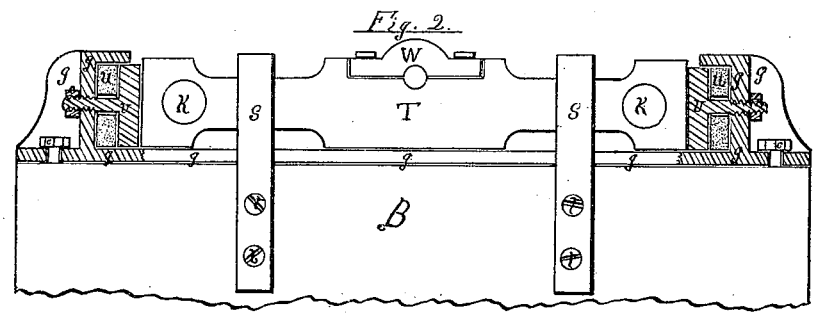

Figure 1 is a plan of my invention. Fig. 2 is a broken sectional end view of Fig. 1. Fig. 3 is a plan, the same as Fig. 1, with its movable parts in different positions, as indicated by full and dotted lines. Fig. 4 is a plan of a cast-iron rudder-head. Fig. 5 is an elevation, showing an end view of Fig. 1. Fig. 6 is a broken vertical transverse section of Fig. 5, cutting through the parts indicated by the dotted line shown in Fig. 1. Fig. 7 is a horizontal cross-section of Fig. 4, cutting the rudder-head and rudder-stock at the point indicated by the dotted line in Fig. 5.

Like letters designate corresponding parts in all the figures.

That others may be acquainted with the construction of my invention, I will describe it as follows: I construct a suitable framework, A B, around the rudder-stock of a ship or vessel. Upon the rudder-stock H I affix a cast-iron rudder-head, F, as shown in Figs. 5, 6, and 7. To cause the rudder-head F and stock H to move simultaneously I secure them together by passing a wrought-iron bar, M, through their diameters, as shown in Fig. 7. This bar is provided with a long flat head, $q$, fitting to the circumference of the rudder-head at one end and a nut, $p$, at the opposite end. I make this connecting-bar M the width of its head $q$, and its thickness to be about the same proportion to its width, as seen in Figs. 6 and 7. A connecting-bar made in the manner described presents a greater surface to the rudder-stock than when made in any other form with a corresponding amount of metal, thereby presenting a greater amount of abrasion surface to the rudder-stock, rendering it less liable to wear from its constant movements when in use. On the opposite sides of the rudder-head, at right angles to the keel, are two lugs, J J, as shown in Figs. 5 and 7. The top of the rudder F is cast with a recess within it, as shown in Fig. 4. The depth of the recess $f$ is indicated in sectional view, Fig. 6. Within the recess is placed a cam, I'. Upon the two sides of the frame B B are two castings, $g\ g\ g\ g\ g$, as represented in Figs. 1, 2, 5, and 6. Bolted down securely by bolts $c\ c\ c\ c\ c$ these castings $g\ g\ g\ g\ g$ are made as long as the sides B B, upon which they rest. At each end of these castings are recesses, provided for the purpose of receiving an elastic substance, $u$, to receive and lessen the effect of a blow. Through the elastic substance $u$ I make a hole, and a corresponding hole in the casting $g$. Through these holes I put the bolts $v\ v\ v\ v$ with heads of sufficient size to fill and be allowed to move back and forth as the elastic substance contracts or expands within the recess. The nuts $e\ e\ e\ e$ are to keep the bolt-heads in their respective places. On the castings $g\ g\ g\ g\ g$, and between the bolt-heads $v\ v\ v\ v$, I place two castings, T T', made in the form as shown in Fig. 2. These two castings are held securely together by iron rods K K. In the center of the castings T T' I place a right-and-left screw, N N, which rests upon its journals in boxes W W, which are secured to the castings T T'. $s\ s\ s\ s$ are straps of iron secured to the frame B B by bolts or screws $t\ t\ t\ t$. These straps project upward beyond the frame B B and castings $g\ g\ g\ g$, so as to embrace the castings T T'. D D' are movable nuts, which approach or recede from the center as the screw is turned either to the right or left.

The rods K K, as above described, have a double use—first, for holding and keeping in position the two castings T T'; second, in passing through and supporting the ends of the two movable nuts D D'.

I I' are two cam-levers, which turn upon a common center, $r$. $n\ n\ n\ n$ are bolts passing through the nuts D D', between the guide-rods K K and the screw N N, held to their places by the nuts $b\ b\ b\ b$, as shown in Figs. 1, 3, and 6. That portion of the bolts $n\ n\ n\ n$ which is within the nuts D D' is made square, and fits in a square hole or mortise in the nuts D D'. By this arrangement the bolts are kept from turning around within the nuts D D' when the movements of the nuts D D' are required. The lower ends of the bolts $n\ n\ n\ n$ are provided with flat heads. Between these heads and the nuts D D' the bolts are made round, the length of this round portion being determined by the thickness of the cam-levers I I'. To the round portion of the bolts $n\ n\ n\ n$ are secured friction-rolls $x\ x\ x\ x$, which rest upon the flat heads of the bolts $n$ $n\ n\ n$, and within the elongated slots $a'\ a'$, which are within the cam-levers I I'. The heads of the bolts $n\ n\ n\ n$ are made large enough in diameter to extend beyond the slots $a'\ a'\ a'\ a'$ and cover a portion of the metal on either side of the slots, for the purpose of a support to the ends of the cams I I'. The recess within the cast-iron rudder-head is made deep enough to receive the thickness of the bolt-heads beneath the cam-lever I', and allow of a free movement therein. $x\ x\ x\ x$ are rings or friction-rolls, which turn on the bolts $n\ n\ n\ n$. L L are movable braces, which turn or swing upon the fulcrum-blocks $d\ d$. $a\ a$ is a rod attached to the braces L L, for the purpose of moving the braces back, as indicated by the dotted form $l$. $h$ is a hook, to which is attached the rod $a\ a$, thereby holding the braces L L back in the position shown in the dotted form $l$.

The method of operating my device for steering purposes is as follows: In order to steer a ship or vessel the operator stands at the wheel E. In the first place, we will suppose our ship or vessel to be sailing with its rudder on an even keel; or, in other words, the rudder and keel are both in the same line or direction. When the rudder is in this position the two nuts D D' and cam-levers I I' are in the positions as shown in Figs. 1, 5, and 6. Now, in order to hold the rudder firmly on an even keel, against the action of the waves, tide, currents, and the motion of the ship, I employ two movable braces, L L, which are brought forward and rest in their respective recesses in the lugs J J.

The movement of the rudder to either the right or left (caused by the action of the water surrounding it) is transmitted through the rudder-stock H to the cast-iron rudder-head above, and so alternately, through the lugs J J, against and through the braces L L, to their fulcrums $d\ d$, thereby relieving the screw N N and its connections from the strain that would otherwise be exerted upon it, if the lugs J J and braces L L were not employed.

To change the course of the ship or vessel, the braces are thrown back simultaneously in the position shown by dotted lines at $l$. These braces are held back by the rod $a\ a\ a\ a$ simply by passing the loop or ring $m$ over the hook $h$, directly beneath the wheel E. Now, to change the course, for instance, to the right, the helmsman turns the wheel E to the left, which movement causes the two nuts D D' to advance toward each other, which at the same time causes the cam-levers I I' to move with them.

The cam-levers I I' are connected to the movable nuts D D', as shown in Fig. 6. The two cam-levers I I' turn upon a common center, one of them being within the rudder-head and the other a short distance above it, the distance being sufficient for the bolt-head $n'$ and a proper clearance thereof. The cam I' rests upon the center-pin $r$, which projects from the rudder F.

The two cams I I', being made in the form shown in Fig. 4, placed together in reversed positions, will take the form shown in Fig. 1, crossing each other at their centers, and bringing alternately the two ends of the cam-lever I opposite to the two ends of the cam-lever I'. Now, it will be observed that the slots in the four ends of the cam-levers I I' come directly beneath the four corners of a parallelogram formed by the two sides of the two nuts D D' and two imaginary lines drawn across the bolts $n\ n'\ n\ n'$, where they receive the bolts $n\ n\ n'\ n'$ and friction-rolls $x\ x\ x\ x$. It will be seen that each cam-lever joins diagonally the two nuts D D' by being attached to the bolts $n\ n\ n'\ n'$. The cam I', being sunk in the rudder-head, receives all of the strain or resistance offered by the rudder whenever the power is applied to the wheel to move it, the other cam-lever, I, being used to counteract the transverse strain upon the screw, which would exist were not the cam-lever I employed. When the rudder is on the right quarter the position of the nuts D D' is as shown in Fig. 3.

To change the course of the ship to the left it will be necessary to move the wheel to the right, changing the position of the nuts D D' to the position as shown by dotted lines in Fig. 3.

The advantage of the screw $n$ over ordinary methods of steering is that it will hold the rudder at any desired point required, requiring less power to work it than by the old methods now in use.

The castings T T' are merely laid on the sides B B, and, as the rudder has a movement independent of that transmitted by the screw, I employ the straps of iron $s\ s\ s\ s$ to keep them to their place, although it will not do to have them fixed rigidly to the sides B B.

I allow a limited upward movement, also an end movement, against the elastic substance $u\ u$, thereby adapting its movements to the circumstances surrounding it.

What I desire to secure by Letters Patent is—

1. A double screw, N N, acting simultaneously upon two nuts, D D', (with their ends supported and guided by rods K K,) in combination with the bolts $n\ n\ n\ n$ and cam-levers I I', as substantially described and set forth in the specification.

2. A cast-iron rudder-head, with its recess $f\ f$, in combination with its cam I', for the purpose herein specified.

3. The lugs J J, in combination with the cast-iron rudder-head F, braces and rod $a\ a$, as substantially described, and for the purpose herein specified.

4. The casting $g\ g\ g\ g$, with its end recesses, in combination with its elastic substance $u$, bolt-heads $v\ v\ v\ v$, as described, and for the purpose specified.

JOHN MYERS.

Witnesses:
 D. W. HAYNES,
 WILLIAM GROGAN.